United States Patent
Ishizuka et al.

(10) Patent No.: US 8,488,202 B2
(45) Date of Patent: Jul. 16, 2013

(54) COMPUTER READABLE MEDIUM INCLUDING DIGITAL IMAGE PRINT SUPPORT PROGRAM, DIGITAL IMAGE PRINT SUPPORT APPARATUS, AND DIGITAL IMAGE PRINT SYSTEM

(75) Inventors: Hiroshi Ishizuka, Kangawa (JP); Hideyasu Ishibashi, Kangawa (JP)

(73) Assignee: FUJIFILM Corporation, Tokyo (JP)

( * ) Notice: Subject to any disclaimer, the term of this patent is extended or adjusted under 35 U.S.C. 154(b) by 2280 days.

(21) Appl. No.: 11/228,266

(22) Filed: Sep. 19, 2005

(65) Prior Publication Data
US 2006/0072141 A1  Apr. 6, 2006

(30) Foreign Application Priority Data
Sep. 27, 2004 (JP) .............................. P.2004-279000

(51) Int. Cl.
*G06F 3/12* (2006.01)

(52) U.S. Cl.
USPC .......... 358/3.26; 358/1.1; 358/1.15; 358/3.27

(58) Field of Classification Search
USPC ................... 358/1.15, 1.16, 1.3, 1.1
See application file for complete search history.

(56) References Cited

U.S. PATENT DOCUMENTS

| | | | |
|---|---|---|---|
| 2004/0027618 A1 * | 2/2004 | Nakamura et al. | 358/3.26 |
| 2004/0114168 A1 * | 6/2004 | Kuiper | 358/1.9 |
| 2005/0105771 A1 * | 5/2005 | Nagai et al. | 382/103 |
| 2006/0050294 A1 * | 3/2006 | Smith et al. | 358/1.15 |
| 2007/0047031 A1 * | 3/2007 | Kaltenbach et al. | 358/504 |

FOREIGN PATENT DOCUMENTS

| | | | |
|---|---|---|---|
| JP | 10-76660 A | | 3/1998 |
| JP | 10076660 | * | 3/1998 |

OTHER PUBLICATIONS

Yanaka Toshiyuki, Ink Jet Printing Apparatus, English Translation.*
Yanaka Toshiyuki, Ink Jet Printing Apparatus, English translation for 10076660.*

* cited by examiner

*Primary Examiner* — King Poon
*Assistant Examiner* — Iriana Cruz
(74) *Attorney, Agent, or Firm* — Sughrue Mion, PLLC

(57) ABSTRACT

A computer readable medium including a digital image print support program that is executable in a computer is used for determining which one of plural printers is suitable for printing an image to be printed. The program has: a first step of dividing an area of the image to be printed into a first image area where a defect is conspicuous, and a second image area where a defect is inconspicuous, and obtaining an area rate of the first image area or the second image area; and a second step of outputting a result of comparison of the area rate with a threshold. A printer is selected in accordance with an output result, and then a less-defective print image can be obtained.

20 Claims, 3 Drawing Sheets

COMPUTER READABLE MEDIUM INCLUDING DIGITAL IMAGE PRINT SUPPORT PROGRAM, DIGITAL IMAGE PRINT SUPPORT APPARATUS, AND DIGITAL IMAGE PRINT SYSTEM

This application is based on Japanese Patent application JP 2004-279000, filed Sep. 27, 2004, the entire content of which is hereby incorporated by reference. This claim for priority benefit is being filed concurrently with the filing of this application.

BACKGROUND OF THE INVENTION

1. Technical Field of the Invention

The present invention relates to a computer readable medium including a digital image print support program capable of selecting an appropriate kind of printer or print condition when a digital image is to be printed, to a digital image print support apparatus, and to digital image print system.

2. Description of the Related Art

Digital cameras are widespread, and a request for printing out digital image data is increasing in a printing service shop. As printers which print out digital image data, used are various printers of the electrophotographic method, the sublimation thermal transfer method, the direct theremosensitive method, the heat development diffusion transfer method, the inkjet method, the silver halide photographic method, and the like. Each of the printers has both an advantage and a disadvantage. For example, in one of the printers, printing can be performed at a high speed, but a defect is easily produced depending on an image, and, in another printer, the speed is low, but printing of a high image quality is enabled for an image of any kind. Even in printers of the same method, the kind of an image in which printing of a high image quality is enabled may be different depending on manufacturers.

In order to enable one printer to print various images at a high image quality, the performance of each printer must be enhanced such as in an inkjet printer disclosed in JP-A-10-76660.

In the inkjet printer, two kinds of print heads, or a high-resolution head and a low-resolution head are mounted, and image data for one sheet to be printed are analyzed to divide the image data into an area where the image is flat, and that where the image is complex. The print heads are selectively used in the two areas.

However, a printing service shop is not always equipped with various latest printers. When an urgent printout is requested, particularly, a printer which is adequate for the printout is selected from plural disposed printers. In the related art, the selection is determined by a service shop clerk while viewing a digital image on a monitor screen.

In the case where an image having a large flat area (an area of the sky), such as a distant view image of Mt. Fuji on a background of the all blue sky is to be printed out, even when a very tiny defect appears in the image of the sky, the image quality which should be given to the customer cannot be satisfied. By contrast, in the case where a complicated image such as that in which plants and trees grow close together in woods is to be printed out, even a small defect appears in the image, nobody notices the defect, and hence the customer does not make a complaint.

While considering such phenomena, it must be determined whether a printer which operates at a high speed but easily causes a defect is used or whether a printer which operates at a low speed but hardly causes a defect is used. This determination requires skill. When the shop is crowded with customers, the determination must be quickly made. In such a case, it is often that the determination is erroneously conducted.

In some cases, the following situation may arise. When the distant view image of Mt. Fuji is printed out under a certain print condition, a defect is not produced, and, when the image of woods is printed out under this print condition, many defects appear and the printout cannot be given to the customer. Therefore, also the selection of a print condition requires skill.

SUMMARY OF THE INVENTION

It is an object of the invention to provide a computer readable medium including a digital image print support program and digital image print support apparatus in which even an skilled person can easily select a printer or print condition to be used, and also a digital image print system in which an image to be printed can be printed out while automatically selecting an adequate printer or print condition. The object is achieved by the following configuration:

(1). A computer readable medium including a set of instructions for determining which, among a plurality of printers or print conditions, printer or print condition is suitable for printing an image to be printed, wherein the set of instructions comprises:

a first step of dividing an area of the image to be printed into a first image area where a defect is conspicuous, and a second image area where a defect is inconspicuous, and obtaining an area rate of the first image area or the second image area; and a second step of outputting a result of comparison of the area rate with a threshold.

(2). The computer readable medium according to (1), wherein the division is conducted by setting an area of the image to be printed where a degree of variation of information is small, to the first image area, and an area where the degree of variation of information is large, to the second image area.

(3). The computer readable medium according to (2), wherein a determination of whether the degree of variation of information is large or small is performed by producing a blurred image of the image to be printed, and comparing a difference between the blurred image and the image to be printed, with a predetermined threshold.

(4). The computer readable medium according to (1), wherein brightness information of the image to be printed is obtained, and the division into the first image area and the second image area is conducted depending on the brightness information.

(5). The computer readable medium according to (4), wherein a blurred image is produced for each of predetermined brightness ranges of the image to be printed, and the division into the first image area and the second image area is conducted by comparing the blurred images with the image to be printed.

(6). The computer readable medium according to any one of (1) to (5), wherein, among the plural printers or print conditions, the printer or print condition to be used is output as the result.

(7). The computer readable medium according to 6, wherein, when there are plural images to be printed, among the results determined respectively for the images to be printed, the result due to the image to be printed in which a defect is most conspicuous is output.

(8). The computer readable medium according to any one of (1) to (7), wherein the plural printers have different printing methods.

(9). The computer readable medium according to (8), wherein the printing methods are plural ones of an electrophotographic method, a sublimation thermal transfer method, a direct theremosensitive method, a heat development diffusion transfer method, an inkjet method, and a silver halide photographic method.

(10). The computer readable medium according to any one of (1) to (9), wherein the print condition is changed by selecting a halftone screen.

(11). The computer readable medium according to any one of (1) to (10), wherein the print condition is changed by selecting usage rates of plural color materials in continuous tone reproduction.

(12). A digital image print support apparatus for determining which, among plural printers or print conditions, printer or print condition is suitable for printing an image to be printed, wherein the apparatus comprises:

a calculating unit for dividing an area of the image to be printed into a first image area where a defect is conspicuous, and a second image area where a defect is inconspicuous, obtaining an area rate of the first image area or the second image area, and comparing the area rate with a threshold; and an outputting unit for outputting a result of the comparison.

(13). The digital image print support apparatus according to (12), wherein the division is conducted by setting an area of the image to be printed where a degree of variation of information is small, to the first image area, and an area where the degree of variation of information is large, to the second image area.

(14). The digital image print support apparatus according to (13), wherein a determination of whether the degree of variation of information is large or small is performed by producing a blurred image of the image to be printed, and comparing a difference between the blurred image and the image to be printed, with a predetermined threshold.

(15). The digital image print support apparatus according to (12), wherein brightness information of the image to be printed is obtained, and the division into the first image area and the second image area is conducted depending on the brightness information.

(16). The digital image print support apparatus according to (15) wherein a blurred image is produced for each of predetermined brightness ranges of the image to be printed, and the division into the first image area and the second image area is conducted by comparing the blurred images with the image to be printed.

(17). The digital image print support apparatus according to any one of (12) to (16), wherein, among the plural printers or print conditions, the printer or print condition to be used is output as the result.

(18). The digital image print support apparatus according to (17), wherein, when there are plural images to be printed, among the results determined respectively for the images to be printed, the result due to the image to be printed in which a defect is most conspicuous is output.

(19). The digital image print support apparatus according to any one of (12) to (18), wherein the plural printers have different printing methods.

(20). The digital image print support apparatus according to (19), wherein the printing methods are plural ones of an electrophotographic method, a sublimation thermal transfer method, a direct theremosensitive method, a heat development diffusion transfer method, an inkjet method, and a silver halide photographic method.

(21). The digital image print support apparatus according to any one of (12) to (20) wherein the print condition is changed by selecting a halftone screen.

(22). The digital image print support apparatus according to any one of (12) to (21), wherein the print condition is changed by selecting usage rates of plural color materials in continuous tone reproduction.

(23). A digital image print system comprising: plural printers; and a digital image print support apparatus according to any one of (12) to (22) which is connected to the printers, and which outputs data of the image to be printed from the outputting unit to an appropriate one of the printers.

(24). The digital image print system according to (23), wherein the digital image print support apparatus sets an appropriate one of print conditions to the appropriate printer.

According to one embodiment of the invention, a printer or a print condition is determined on the basis of an image to be printed which is read in by a computer. Even when a clerk of a printing service shop is unskilled in the determination, therefore, a print image in which a defect is inconspicuous can be provided to the customer.

DETAILED DESCRIPTION OF THE INVENTION

Hereinafter, an embodiment of the invention will be described with reference to the accompanying drawings.

Figure 1:
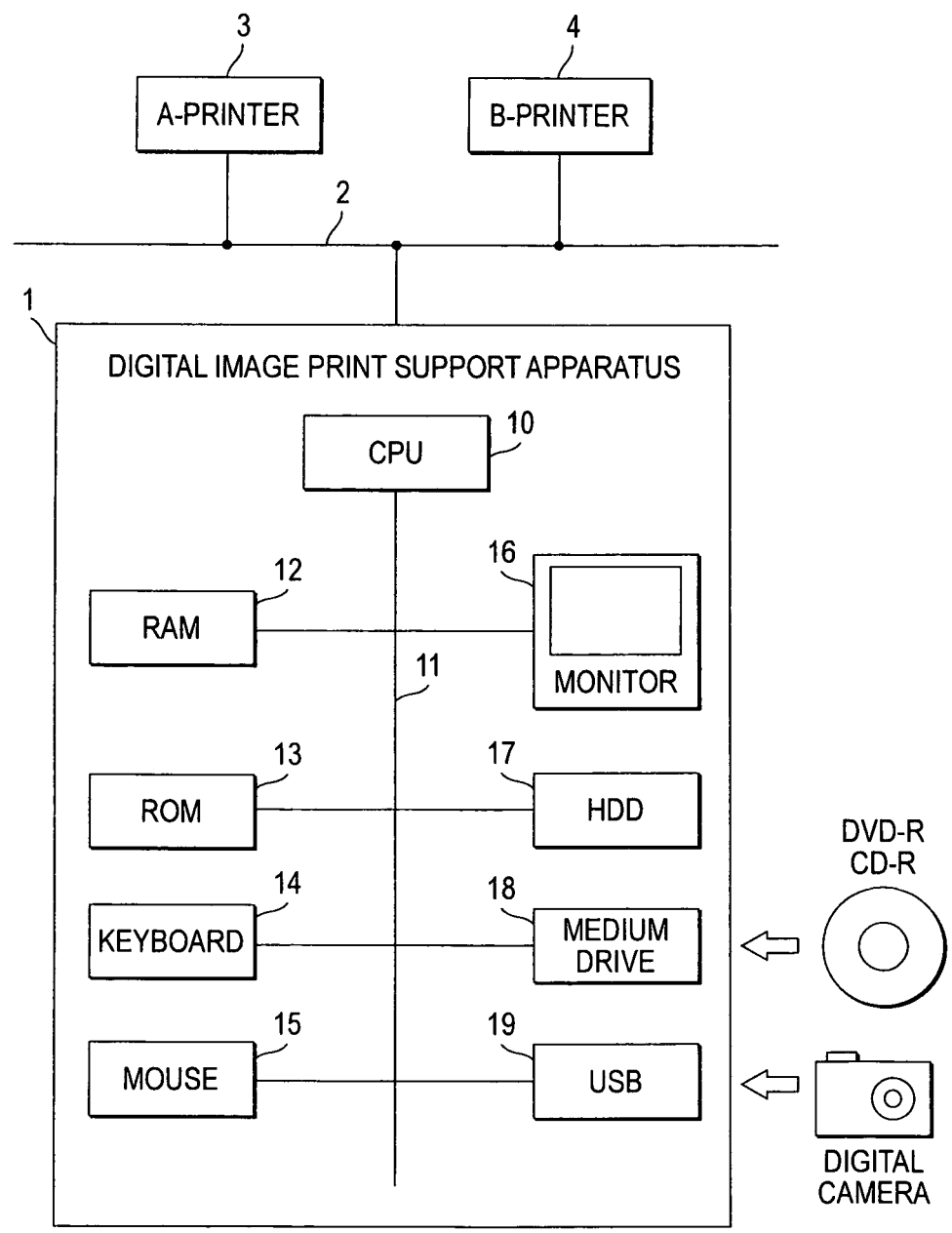
FIG. 1 is a system diagram of a digital image print system of an embodiment of the invention.

FIG. 1 is a system diagram of a digital image print system of an embodiment of the invention. The digital image print system is configured by: a digital image print support apparatus 1 which is configured by loading a digital image print support program into a personal computer; and an A-printer 3 and a B-printer 4 which are connected to the digital image print support apparatus 1 by a LAN 2. The A-printer 3 and the B-printer 4 are printers of different methods which are different from each other in print speed and susceptibility of noise induction.

The digital image print support apparatus 1 comprises: a CPU 10; a bus 11 connected to the CPU 10; a RAM 12 which is used as a main memory; a ROM 13 which stores an initial program; a keyboard 14 and a pointing device 15 such as a mouse which function as input devices; a monitor device 16 which functions as an output device; a hard disk drive 17 which stores application software such as the digital image print support program, and printing characteristic data of the printers 3, 4; a driving unit 18 which drives an optical storage medium such as a CD-R or a DVD-R; and a USB (Universal Serial Bus) input port 19. The application software may be stored in any well-known equivalent information storage structure, not limited to the hard disk drive. For example, but not by way of limitation, an optical or magnetic disk, a portable memory storage device but not limited thereto, a remote data storage system, or other data storage structure as would be known to one of ordinary skill in the art may be employed.

Figure 2:
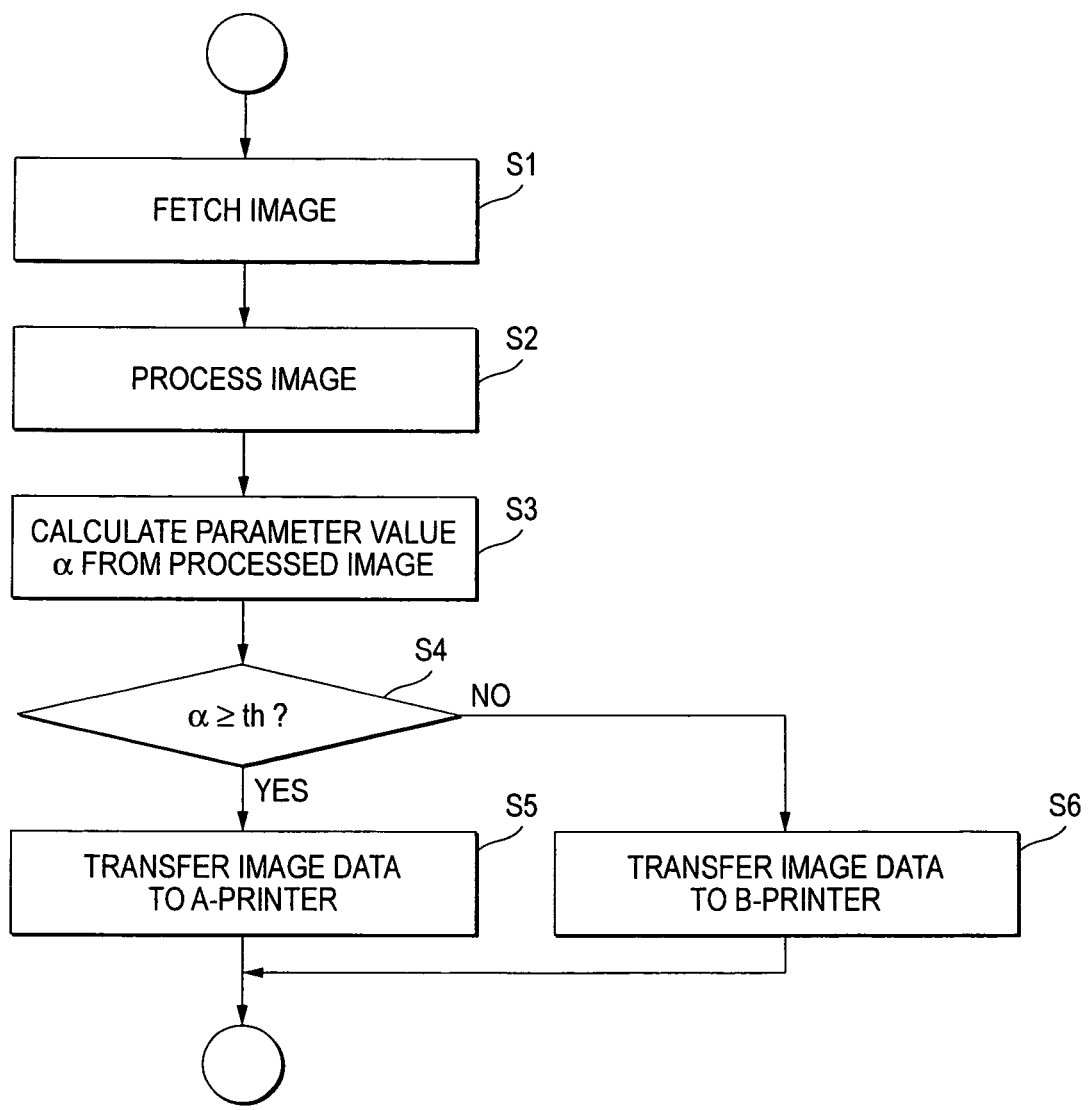
FIG. 2 is a flowchart showing the procedure of a digital image print support program which is implemented by a digital image print support apparatus shown in FIG. 1.

FIG. 2 is a flowchart showing the procedure of the digital image print support program. A service shop clerk receives a medium such as a CD-R or a DVD-R which stores digital image data, and loads it into the driving unit 18. Then, a list of files in the medium is displayed on a screen of the monitor device 16. Alternatively, when the customer brings a digital camera itself into the shop, the digital camera is connected to the USB input port 19 whereby a list of digital image data is displayed on the monitor device 16.

When the service shop clerk selects an image file to be printed from the list by means of the mouse 15, the digital image print support program reads the selected image data (step S1). Next, a predetermined image process such as that described later is applied to the image data (step S2). Then, the processed image is analyzed to calculate the value a of a predetermined parameter (step S3), and the value a is compared with a threshold th (step S4).

If $\alpha \geq th$ as a result of the comparison, the A-printer 3 is selected as the printer to be used. Namely, the image data fetched in step S1 are transferred to the A-printer 3 via the LAN 2 (step S5), the A-printer 3 prints out the image data, and then the support process for the image data is ended. If $\alpha < th$ as a result of the comparison, the B-printer 4 is selected as the printer to be used. Namely, the image data fetched in step S1 are transferred to the B-printer 4 via the LAN 2 (step S6), the B-printer 4 prints out the image data, and then the support process for the image data is ended.

The example shown in FIGS. 1 and 2 is configured so that the digital image print support apparatus 1, the A-printer 3, and the B-B printer 4 are connected together by the LAN 2, and the digital image print support apparatus 1 transfers image data to be printed to the printer 3 or 4. In some printing service shops, however, it is configured so that the digital image print support apparatus 1 is not connected to the printers 3, 4, and a service shop clerk causes a medium storing image data to be read in the printer 3 or 4.

Figure 3:
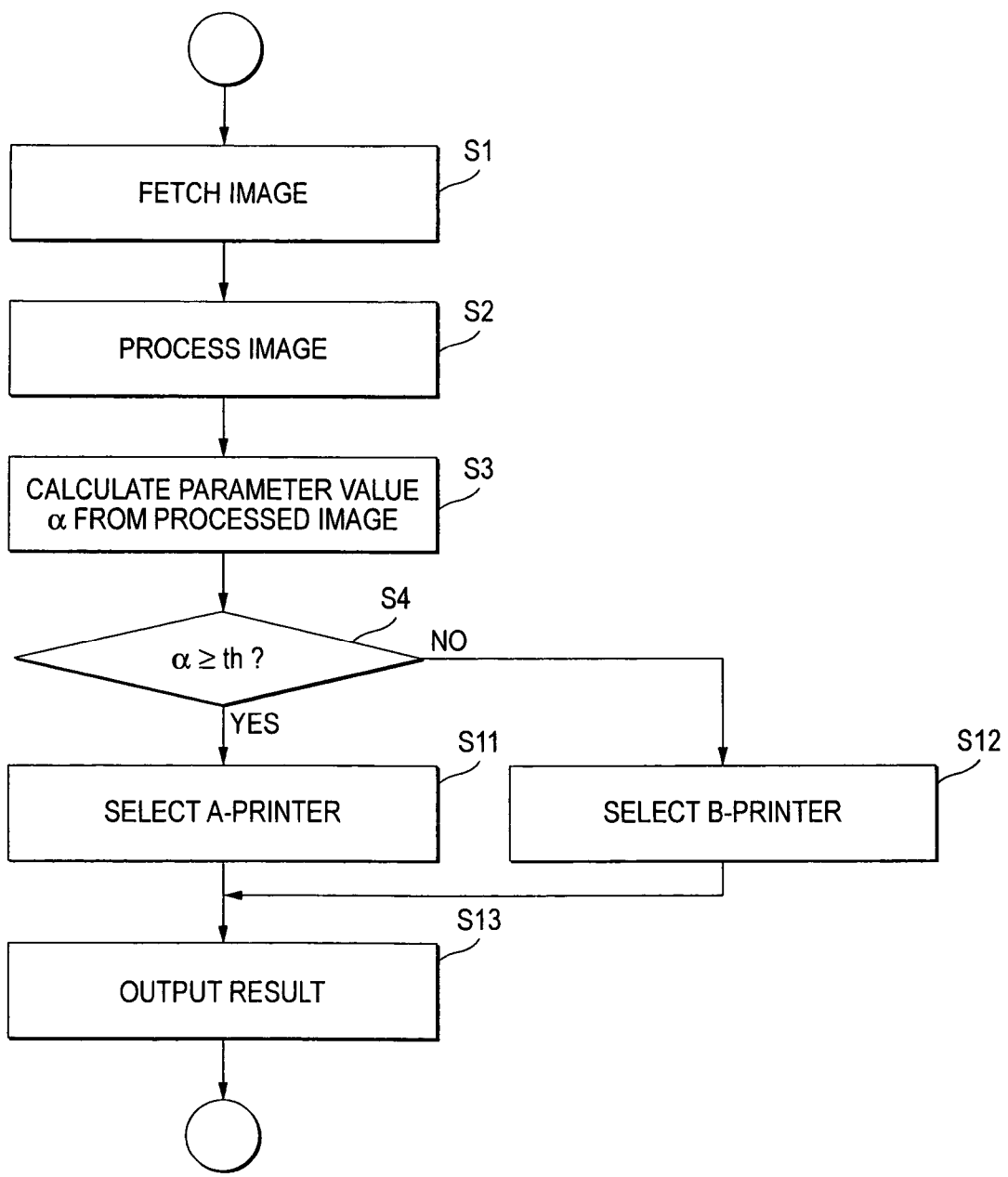
FIG. 3 is a flowchart showing the procedure of a digital image print support program which is implemented in the case where the digital image print support apparatus shown in FIG. 1 independently exists without being connected to a printer.

When the digital image print support apparatus 1 is independently used in this way, the digital image print support program performs the process shown in FIG. 3. Steps S1, S2, S3, and S4 are identical with those of FIG. 2. In accordance with the result of the determination of step S4, a printer to be used is selected based on the printing characteristic data of the printers 3, 4 (steps S11, S12). Then, a result of the selection is displayed on the monitor device 16 (step S13), thereby informing the service shop clerk of the selection result. In this case, the printer selection of the service shop clerk can be supported simply by outputting the value of the parameter $\alpha$.

When the customer requests printouts of a plurality of, for example, ten image data, the printing out process can be performed while distributing the printouts one by one to the A-printer 3 and the B-printer 4. In some cases, however, it is convenient to collectively perform the printing out process by one of the printers. In such a case, the parameter value $\alpha$ is obtained from each of the ten image data, and a printer is selected in accordance with the severest value of $\alpha$. When even one image which is susceptible to noises (for example, the above-mentioned image of Mt. Fuji) is included in the image data, a printer of fewer noises is selected. As a result, ten image prints in all of which fewer noises are produced can be given to the customer.

Next, the method of the image process in steps S2, S3, and S4, and a specific example of the parameter value $\alpha$ will be described.

A dry digital printer of the electrophotographic method, the sublimation thermal transfer method, the direct theremosensitive method, the heat development diffusion transfer method, the inkjet method, or the like is inferior in uniformity of printed images than a wet printer of the silver halide photographic method or the like. There is a possibility that a defect (noises) which is called a streak, an unevenness, a spot, or the like occurs in a printed image, thereby impairing the print quality.

As described above, when such a defect occurs in a flat image such as "all blue sky," the defect is conspicuous, but, when such a defect occurs in a busy image where plants and trees grow close together, the defect is inconspicuous. In the embodiment, therefore, the image to be printed is processed, and a rate of a flat image area in one image is calculated as the parameter value $\alpha$. The flat image area rate is compared with, for example, a threshold of 50%. If the rate is larger than the threshold, the image is an image in which a defect easily occurs, and hence a printer which hardly causes a defect is selected. If the flat image area rate is smaller than the threshold, it is determined that the image is an image in which, even when a defect occurs, the defect is inconspicuous, and hence a printer which may cause a defect, but which can perform a high-speed print is selected.

Alternatively, the determination of whether or not the image is an image in which a defect is conspicuous may be performed based on the brightness of the image to be printed. In the case of a defect such as a white spot or a white streak, the defect is inconspicuous in a high-brightness area because a contrast between a white spot and the surrounding is low, but conspicuous in a low-brightness area because the contrast is high. In a high or medium-brightness area, a colored streak or spot, and an unevenness are conspicuous. Therefore, the brightness of an image to be printed is detected, and a printer is selected. In the case where image data are expressed by the sRGB color space, the data are converted to the CIE Lab color system, and then the brightness is obtained. The conversion between sRGB and Lab may be conducted with using a lookup table which is previously obtained by measuring patches that are output from the relevant printers, or with using an approximate conversion formula.

In the embodiment, an optimum printer is determined. Even in a single printer, similar printing out processes can be performed by changing the print conditions. In the case of an image in which a defect is conspicuous, for example, an error diffusion screen is selected, or a rotation screen is selected. By contrast, in the case of an image in which a defect is inconspicuous, a dither matrix screen is selected, or a screen which produces the same phase relationship for respective colors is selected.

In a printer using an ink or toner of a dark color and an ink or toner of a light color, in the case of an image in which a defect is conspicuous, printing including the light color is performed, and, in the case of an image in which a defect is inconspicuous, printing is performed with using only the dark color.

Hereinafter, specific examples will be described.

EXAMPLE 1

An image to be printed (input image) is effected and converted to a brightness (luminance) image. Namely, a color image is converted to a monochrome image. The convolution integral due to a two-dimensional Gaussian blur function is applied to the monochrome image to produce a blurred image. In this case, for example, the standard deviation is set to "8" (the process of step S2).

Next, the difference between the input image and the blurred image is compared with a threshold k. The area is divided so that an area in which the difference is not larger than the threshold k is set to an area in which a defect is conspicuous, and an area in which the difference is larger than the threshold k is set to an area in which a defect is inconspicuous. The value (%) of an area percentage α of the area in which a defect is conspicuous is calculated (the process of step S3).

The value of the area percentage α is compared with the threshold th (for example, 50%). An input image in which the value is smaller than the threshold th is determined as an image in which a defect is inconspicuous, and that in which the value is equal to or larger than the threshold th is determined as an image in which a defect is conspicuous (the process of step S4). The image in which a defect is conspicuous is printed by a printer of, for example, the silver halide photographic method, and that in which a defect is inconspicuous is printed by a printer of, for example, the direct theremosensitive method.

In place of the convolution integral of a blur function, a spatial filtering process can be performed to produce a blurred image. The convolution integral of a blur function (step S2) and the threshold process of a differential image (step S3) may be replaced with the Laplacian filtering process.

EXAMPLE 2

An image to be printed (input image) is converted to a brightness (luminance) image (a color image→a monochrome image). The monochrome image is divided into three kinds of portions (the process of step S2):
(A) luminance of 0 to 85;
(B) luminance of 86 to 170; and
(C) luminance of 171 to 255.

Next, an area percentage is obtained for each of (A), (B), and (C) (the process of step S3), and the area percentages are compared with thresholds th which are set for (A), (B), and (C), respectively (the process of step S4). For example, the thresholds th are set as threshold (A)=40%, threshold (B)=50%, and threshold (C)=50%, respectively.

In the case where the image to be printed satisfies one of relationships of area percentage (A)≧threshold (A), area percentage (B)≧threshold (B), and area percentage (C)≧threshold (C), the image is determined as an image in which a defect is conspicuous, and printed by a printer of the silver halide photographic method. In the other case, the image is determined as an image in which a defect is inconspicuous, and printed by a printer of the direct theremosensitive method.

EXAMPLE 3

An image to be printed (input image) is converted to a brightness (luminance) image (a color image→a monochrome image). The monochrome image is divided into five kinds of portions (the process of step S2):
(A) luminance of 0 to 85;
(B) luminance of 86 to 96;
(C) luminance of 97 to 160;
(D) luminance of 161 to 224; and
(E) luminance of 225 to 255.

Next, in the same manner as Example 1, a blurred image is produced for each of the portions, and an area percentage of the area in which a defect is conspicuous (the process of step S3). The area percentages are compared with thresholds th which are set for (A), (B), (C), (D), and (E), respectively (the process of step S4).

For example, the thresholds th are set as threshold (A)=70%, threshold (B)=40%, threshold (C)=20%, threshold (D)=20%, and threshold (E)=30%, respectively. When the area percentage exceeds the threshold th in any one of the portions, the input image is determined as an image in which a defect is conspicuous, and printed by a printer which does not produce a conspicuous defect.

EXAMPLE 4

As a printer, only a printer of the electrophotographic method manufactured by F company is used. The determination of whether an image to be printed is an image where a defect is conspicuous, or that where a defect is inconspicuous is performed by one of Examples 1 to 3. In the case of an image where a defect is conspicuous, printing is conducted with using a rotation screen, and, in the case of an image where a defect is inconspicuous, printing is conducted with using a screen which produces the same phase relationship for respective colors. In a configuration where a printer of another method and that of the electrophotographic method are disposed, when the printer of the electrophotographic method is selected by another condition, Example 4 may be implemented.

EXAMPLE 5

As a printer, only an inkjet printer manufactured by E company is used. The determination of whether an image to be printed is an image where a defect is conspicuous, or that where a defect is inconspicuous is performed by one of Examples 1 to 3. In the case of an image where a defect is conspicuous, printing is conducted by a seven color ink mode including only light colors, and, in the case of an image where a defect is inconspicuous, printing is conducted by a four-color ink mode including only dark colors. In a configuration where a printer of another method and an inkjet printer are disposed, when the inkjet printer is selected by another condition, Example 5 may be implemented.

In the embodiment described above, for the sake of simplicity of description, the system in which only the two printers 3, 4 are used has been described. It is matter of course that the system may be configured so that the system comprises three or more printers, and a print condition of each of the printers is set in the printer by the support apparatus 1 or a service shop clerk viewing an output of the support apparatus 1.

According to the invention, an adequate printer can be appropriately selected from plural printers on the basis of an image to be printed, and hence is useful as a digital image print support apparatus. When a digital image print support system is constructed with using the apparatus, the system is useful.

What is claimed is:

1. A non-transitory computer program product for use with a computer, the computer program product comprising a computer usable medium including a set of instructions for determining which, among a plurality of printers or print conditions, printer or print condition is suitable for printing an image to be printed, wherein the set of instructions comprises: a first step of dividing an area of the image to be printed into a first image area, and a second image area, and obtaining a proportion of the first image area or the second image area relative to an entire area of the image; and a second step of comparing the obtained proportion of the first image area or of the second image area to a threshold and outputting a result of the comparing, wherein the division is conducted by setting an area of the image to be printed where a degree of variation of information is small, to the first image area, and an area where the degree of variation of information is large, to the second image area, and wherein a determination of whether the degree of variation of information is large or small is performed by producing a blurred image of the image to be printed, and comparing a difference between the blurred image and the image to be printed, with a predetermined threshold.

2. The non-transitory computer program product according to claim 1, wherein brightness information of the image to be printed is obtained, and the division into the first image area and the second image area is conducted depending on the brightness information.

3. The non-transitory computer program product according to claim 2, wherein a blurred image is produced for each of predetermined brightness ranges of the image to be printed, and the division into the first image area and the second image area is conducted by comparing the blurred images with the image to be printed.

4. The non-transitory computer program product according to claim 1, wherein, among the plural printers or print conditions, the printer or print condition to be used is output as the result.

5. The non-transitory computer program product according to claim 4, wherein, when there are plural images to be printed, among the results determined respectively for the images to be printed, the result due to the image to be printed in which a defect is most conspicuous is output.

6. The non-transitory computer program product according to claim 1, wherein the plural printers have different printing methods.

7. The non-transitory computer program product according to claim 6, wherein the printing methods are plural ones of an electrophotographic method, a sublimation thermal transfer method, a direct theremosensitive method, a heat development diffusion transfer method, an inkjet method, and a silver halide photographic method.

8. The non-transitory computer program product according to claim 1, wherein the print condition is changed by selecting a halftone screen.

9. The non-transitory computer program product according to claim 1, wherein the print condition is changed by selecting usage rates of plural color materials in continuous tone reproduction.

10. A digital image print support apparatus for determining which, among plural printers or print conditions, printer or print condition is suitable for printing an image to be printed, wherein the apparatus comprises: a calculating unit for dividing an area of the image to be printed into a first image, and a second image area, obtaining a proportion of the first image area or the second image area relative to an entire area of the image, and comparing the obtained proportion of the first image area or the second image area to a threshold; and an outputting unit for outputting a result of the comparison made by the calculating unit, wherein the division is conducted by setting an area of the image to be printed where a degree of variation of information is small, to the first image area, and an area where the degree of variation of information is large, to the second image area, and wherein a determination of whether the degree of variation of information is large or small is performed by producing a blurred image of the image to be printed, and comparing a difference between the blurred image and the image to be printed, with a predetermined threshold.

11. The digital image print support apparatus according to claim 10, wherein brightness information of the image to be printed is obtained, and the division into the first image area and the second image area is conducted depending on the brightness information.

12. The digital image print support apparatus according to claim 11, wherein a blurred image is produced for each of predetermined brightness ranges of the image to be printed, and the division into the first image area and the second image area is conducted by comparing the blurred images with the image to be printed.

13. The digital image print support apparatus according to claim 10, wherein, among the plural printers or print conditions, the printer or print condition to be used is output as the result.

14. The digital image print support apparatus according to claim 13, wherein, when there are plural images to be printed, among the results determined respectively for the images to be printed, the result due to the image to be printed in which a defect is most conspicuous is output.

15. The digital image print support apparatus according to claim 10, wherein the plural printers have different printing methods.

16. The digital image print support apparatus according to claim 15, wherein the printing methods are plural ones of an electrophotographic method, a sublimation thermal transfer method, a direct theremosensitive method, a heat development diffusion transfer method, an inkjet method, and a silver halide photographic method.

17. The digital image print support apparatus according to claim 10, wherein the print condition is changed by selecting a halftone screen.

18. The digital image print support apparatus according to claim 10, wherein the print condition is changed by selecting usage rates of plural color materials in continuous tone reproduction.

19. A digital image print system comprising: plural printers;
and the digital image print support apparatus according to claim 10 which is connected to the printers, and which outputs data of the image to be printed from the outputting unit to an appropriate one of the printers.

20. The digital image print system according to claim 19, wherein the digital image print support apparatus sets an appropriate one of print conditions to the appropriate printer.

* * * * *